United States Patent [19]
Cyphert

[11] 3,944,277
[45] Mar. 16, 1976

[54] SIDEWARDLY MOVABLE VEHICLE SEAT WITH ENCLOSURE

[76] Inventor: Lloyd W. Cyphert, 252 E. Fifth St., Salem, Ohio 44460

[22] Filed: Nov. 1, 1974

[21] Appl. No.: 519,912

[52] U.S. Cl................ 296/68; 180/89 R; 296/28 C
[51] Int. Cl.²............................................ B60N 1/00
[58] Field of Search ......... 296/68, 65 R, 66, 67, 69, 296/26, 23 C, 28 C; 258/8, 9; 180/89 R

[56] References Cited
UNITED STATES PATENTS

| | | | |
|---|---|---|---|
| 1,964,894 | 7/1934 | Rohne................................... | 296/26 |
| 2,154,810 | 4/1939 | Goeddertz...................... | 296/65 R X |
| 2,902,312 | 9/1959 | Ferrera............................. | 296/23 C |
| 3,850,470 | 11/1974 | Trelle................................ | 296/23 C |
| D168,440 | 12/1952 | Flatt................................ | 296/68 X |

FOREIGN PATENTS OR APPLICATIONS

| | | | |
|---|---|---|---|
| 875,049 | 8/1961 | United Kingdom................... | 296/46 |
| 822,772 | 9/1937 | France.............................. | 296/23 C |

*Primary Examiner*—Robert J. Spar
*Assistant Examiner*—Donald W. Underwood
*Attorney, Agent, or Firm*—Webster B. Harpman

[57] ABSTRACT

A seat on a movable platform having a partial enclosure about one end thereof is arranged for movement in and out of a door opening in a vehicle, the outer end portion of the enclosure includes a window, the remainder of the enclosure forming front and back and top and bottom portions of the end closure.

4 Claims, 2 Drawing Figures

SIDEWARDLY MOVABLE VEHICLE SEAT WITH ENCLOSURE

BACKGROUND OF THE INVENTION

1. Field of the Invention

This invention relates to vehicles and movable seat constructions therein.

2. Description of the Prior Art

Prior devices of this type include a transversely movable passenger seat as seen in U.S. Pat. No. 3,071,407 and a swing out vehicle seat as seen in U.S. Pat. No. 3,147,994. Seats on movable platforms are disclosed in U.S. Pat. No. 3,419,164.

This invention provides a movable seat and a partial enclosure thereabout particularly suited for use in mail delivery cars enabling the driver of the car to move sidewardly relative to the car as in the direction of a rural mailbox or the like.

SUMMARY OF THE INVENTION

A sidewardly movable vehicle seat with an enclosure partially thereabout is positioned in a vehicle for movement into and out of a door opening therein. The seat is on a movable platform, the outermost end of which has a modified door affixed thereto with inwardly extending top, bottom and side wall sections. The modified door may be hinged so as to be opened with respect to the partial enclosure and is provided with an inward radius in which the usual window is located, power actuated means in the vehicle moves the seat and its partial enclosure relative to the vehicle.

DESCRIPTION OF THE PREFERRED EMBODIMENT

Figure 1:
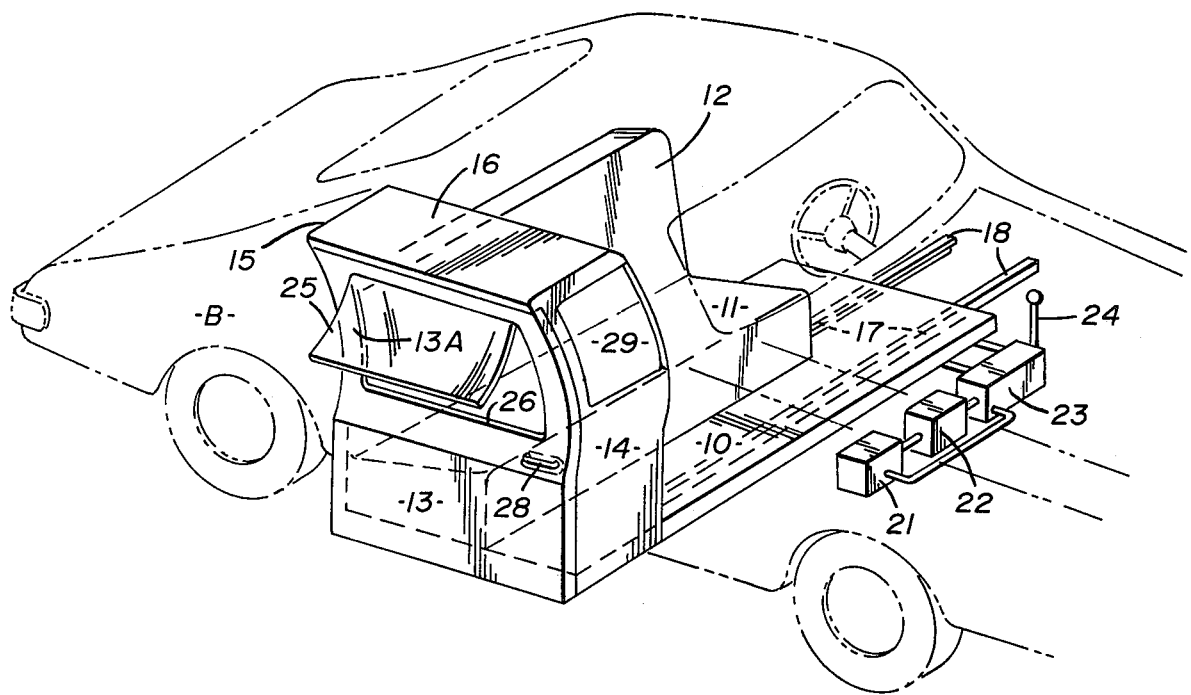
FIG. 1 is a perspective elevation of the sidewardly movable vehicle seat with partial enclosure, broken lines indicating the vehicle in which the device is positioned.

The invention in the form disclosed herein consists of a platform 10 having a seat 11 thereon complete with a back portion 12. A partial enclosure consistng of a door 13, front wall 14, rear wall 15 and a top 16 is carried by the platform 10 at one end thereof so as to partially enclose the seat 11 and its back portion 12 when the platform 10 is moved sidewardly and partially out of a vehicle body B as seen in broken lines in FIGS. 1 and 2 of the drawings. The platform 10 is provided with spaced parallel rails 17 slideably engaging a pair of spaced, parallel flanges 18 secured to the vehicle body B. If desired anti-friction bearings may be incorporated in the rails 17 and/or the flanges 18 as will occur to those skilled in the art. Means for moving the platform 10 longitudinally of the flanges 18 is provided and comprises a piston and cylinder assembly 19, the piston rod 20 of which is engaged on a depending bracket 20A secured to the platform 10. The cylinder 19 is double acting and a source of fluid power such as a pump, reservoir and connecting piping controlled by a suitable valve is positioned in the vehicle so that the cylinder 19 may be energized by the operator of the vehicle to move the seat 11 and the platform 10 transversely thereof as desired.

Figure 2:
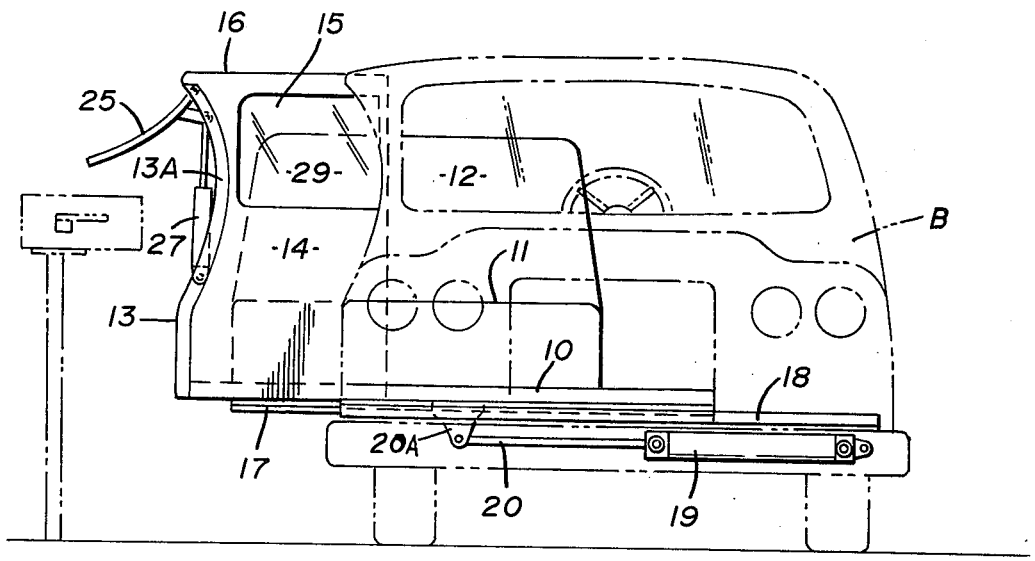
FIG. 2 is a front elevation of the movable seat with partial enclosure with broken lines illustrating a vehicle in which the same is positioned.

In FIG. 1 of the drawings, the fluid power source is illustrated as comprising a reservoir 21, a pump 22 and a directional valve 23 having an operating lever 24. The valve 23 communicates with the cylinder 19 which is illustrated in FIG. 2 of the drawings.

The door portion 13 of the partial enclosure is inwardly bowed as at 13A and a window 25 is hinged in a window opening 26 in the door 13. A secondary hydraulic piston and cylinder assembly 27 is provided as seen in FIG. 2 of the drawings for moving the window 25 from open to closed position. The door portion 13 of the enclosure of the invention may be fixed to the remainder of the enclosure or it may be hinged thereto as illustrated and provided with a handle 28 so that it can be opened and closed relative to the remainder of the partial enclosure. The front wall 14 of the partial enclosure has a glazed window 29 therein which will register with the windshield of the vehicle when the partial enclosure is within the vehicle. It will occur to those skilled in the art that if desired the seat 11 and its back portion 12 may be of smaller size than illustrated relative to the platform 10 on which it is positioned so as to provide additional capacity for packages, mailbags or the like which will move with the seat and the partial enclosure relative to the vehicle.

It will further occur to those skilled in the art that when the vehicle has a transmission and drive line hump extending through the passenger compartment, the movable platform 10 and the seat 11 may be modified to be positioned on one side of the hump and movable away therefrom when the partial enclosure of the device moves outwardly of the door opening of the vehicle.

It will thus be seen that a sidewardly movable vehicle seat with a partial enclosure has been disclosed which will enable a driver of the vehicle equipped with the same to move sidewardly partially out of the vehicle as in reaching a rural mailbox for example in the delivery of mail thereto.

Having thus described my invention what I claim is:

1. A sidewardly movable seat for a vehicle having a body with a door opening in one side thereof comprising a platform and means in said vehicle movably mounting said platform for transverse motion with respect thereto, a seat on said platform including a back portion therefor, front, back and top walls on one portion of said platform arranged for telescopic movement with said platform into and out of said door opening of said body, a window in at least one of said walls and a door adapted for closing registry with said door opening and hinges mounting the same on one of said front and back walls to form a partial enclosure extending inwardly from said door and partially enclosing a portion of said platform and a portion of said seat thereon and means in said vehicle for moving said platform seat and partial enclosure into and out of said door opening.

2. The sidewardly movable vehicle seat of claim 1 wherein said door is formed with an inwardly extending concave portion.

3. The sidewardly movable vehicle seat set forth in claim 1 wherein a window opening is formed in said door and a window is movably positioned in said opening.

4. The sidewardly movable vehicle seat of claim 1 wherein said means movably mounting said platform comprise elongated members on said platform; secondary elongated members in said body slidably engaging said first mentioned elongated members, a piston and cylinder assembly connecting said body and said platform and a source of fluid power for said piston and cylinder assembly and valve means controlling the same.

* * * * *